US011286790B2

(12) United States Patent
Quach et al.

(10) Patent No.: US 11,286,790 B2
(45) Date of Patent: Mar. 29, 2022

(54) COOLING PASSAGES FOR GAS TURBINE ENGINE COMPONENT

(71) Applicant: Raytheon Technologies Corporation, Farmington, CT (US)

(72) Inventors: San Quach, East Hartford, CT (US); Christopher King, Bristol, CT (US); Tracy A. Propheter-Hinckley, Manchester, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 17/009,936

(22) Filed: Sep. 2, 2020

(65) Prior Publication Data

US 2021/0017863 A1    Jan. 21, 2021

Related U.S. Application Data

(62) Division of application No. 14/949,047, filed on Nov. 23, 2015, now abandoned.

(Continued)

(51) Int. Cl.
*F01D 5/18* (2006.01)
*F01D 9/04* (2006.01)
(Continued)

(52) U.S. Cl.
CPC ............. *F01D 5/186* (2013.01); *F01D 9/041* (2013.01); *F01D 11/08* (2013.01); *F01D 25/12* (2013.01);
(Continued)

(58) Field of Classification Search
CPC ............. F05D 2240/12; F05D 2240/30; F05D 2240/35; F05D 2260/202; F01D 5/186; F01D 9/041
See application file for complete search history.

(56) References Cited

U.S. PATENT DOCUMENTS 4,664,597 A    5/1987 Auxier et al.
4,672,727 A    6/1987 Field
(Continued)

FOREIGN PATENT DOCUMENTS

| EP | 2390464 | 11/2011 |
|----|---------|---------|
| EP | 2468433 | 6/2012 |
| EP | 2679772 | 5/2015 |

OTHER PUBLICATIONS

The Extended European Search Report for European Application No. 15200253.1, dated May 3, 2016.

*Primary Examiner* — Todd E Manahan
*Assistant Examiner* — Thuyhang N Nguyen
(74) *Attorney, Agent, or Firm* — Carlson, Gaskey & Olds, P.C.

(57) ABSTRACT

A gas turbine engine component includes a wall that has an inner surface and an outer surface. An inlet is defined by the inner surface. At least one non-rectangular slot is defined by the outer surface and includes at least one protrusion extending into the slot. A slot passage fluidly connects the inlet to the at least one non-rectangular slot. The slot passage comprises an inlet portion that extends through the wall from the inlet to an intermediate portion. An outlet portion extends through the wall from the intermediate portion to the at least one non-rectangular slot.

18 Claims, 3 Drawing Sheets

Related U.S. Application Data

(60) Provisional application No. 62/091,992, filed on Dec. 15, 2014.

(51) Int. Cl.

| | | |
|---|---|---|
| *F01D 11/08* | (2006.01) | |
| *F01D 25/12* | (2006.01) | |
| *F02C 7/18* | (2006.01) | |
| *F23R 3/00* | (2006.01) | |
| *F04D 29/32* | (2006.01) | |

(52) U.S. Cl.
CPC .............. *F02C 7/18* (2013.01); *F04D 29/324* (2013.01); *F23R 3/002* (2013.01); *F05D 2220/32* (2013.01); *F05D 2240/12* (2013.01); *F05D 2240/30* (2013.01); *F05D 2240/35* (2013.01); *F05D 2250/13* (2013.01); *F05D 2250/182* (2013.01); *F05D 2250/183* (2013.01); *F05D 2250/184* (2013.01); *F05D 2250/185* (2013.01); *F05D 2260/202* (2013.01); *F05D 2260/204* (2013.01); *F23R 2900/03042* (2013.01); *Y02T 50/60* (2013.01)

(56) References Cited

U.S. PATENT DOCUMENTS

| | | | |
|---|---|---|---|
| 7,125,225 B2* | 10/2006 | Surace | ................... F01D 5/187 |
| | | | 416/96 R |
| 7,510,367 B2 | 3/2009 | Liang | |
| 8,002,525 B2 | 8/2011 | Whalley | |
| 8,733,111 B2 | 5/2014 | Gleiner et al. | |
| 8,763,402 B2 | 7/2014 | Xu et al. | |
| 8,978,390 B2* | 3/2015 | Levasseur | ............... F01D 9/065 |
| | | | 60/806 |
| 2005/0135933 A1 | 6/2005 | Gregg | |
| 2009/0003987 A1 | 1/2009 | Zausner et al. | |
| 2010/0068068 A1* | 3/2010 | Liang | ...................... F01D 5/186 |
| | | | 416/97 R |
| 2012/0163992 A1* | 6/2012 | Propheter-Hinckley | .................... |
| | | | B22C 9/24 |
| | | | 416/97 R |
| 2013/0205794 A1* | 8/2013 | Xu | ......................... F01D 5/186 |
| | | | 60/754 |
| 2013/0259645 A1 | 10/2013 | Bergholz, Jr. et al. | |
| 2013/0259705 A1 | 10/2013 | Bergholz, Jr. et al. | |
| 2013/0302179 A1* | 11/2013 | Bergholz, Jr. | .......... F01D 5/189 |
| | | | 416/97 R |
| 2013/0330180 A1 | 12/2013 | Guendogdu et al. | |
| 2014/0219815 A1 | 8/2014 | Kohli et al. | |

\* cited by examiner

COOLING PASSAGES FOR GAS TURBINE ENGINE COMPONENT

CROSS-REFERENCE TO RELATED APPLICATIONS

This application a divisional of U.S. application Ser. No. 14/949,047 filed Nov. 23, 2015 which claims priority to U.S. Provisional Application No. 62/091,992, which was filed on Dec. 15, 2014 and is incorporated herein by reference.

STATEMENT REGARDING FEDERALLY SPONSORED RESEARCH OR DEVELOPMENT

This invention was made with government support under Contract No. N00019-12-D-0002 awarded by the United States Navy. The Government has certain rights in this invention.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Turbine airfoils, combustor liners, and blade outer air seals (BOAS) operate in an environment where the gas temperatures often exceed the material capability. Therefore, these components require cooling to protect against damage. Cooling airflow from the compressor is directed and provides internal convection cooling inside the airfoils. The problem with high amounts of cooling airflow is that less hot gas is available for work extraction, which reduces the efficiency of the gas turbine engine. As demands to increase thrust and/or efficiency persist, designers of gas turbine engines are faced with increasing turbine inlet temperatures or reduced cooling flow allocation. Therefore, there is a need to increase the cooling effectiveness of components operating in high temperature regions of the gas turbine engine without sacrificing the efficiency of the gas turbine engine.

SUMMARY

In one exemplary embodiment, a gas turbine engine component includes a wall having an inner surface and an outer surface. At least one non-rectangular slot extends through the outer wall surface and is in communication with a passage. The passages extend through the wall and include an inlet portion located at the inner surface and an outlet portion located at the outer surface. An intermediate portion fluidly connects the inlet portion and the outlet portion.

In a further embodiment of the above, a slot includes an elongated trapezoidal shape.

In a further embodiment of any of the above, at least one non-rectangular slot includes a plurality of protrusions that extend into the slot from at least one of a downstream side and an upstream side.

In a further embodiment of any of the above, at least one non-rectangular slot includes a serpentine profile.

In a further embodiment of any of the above, at least one non-rectangular slot includes a plurality of non-rectangular slots spaced radially from each other.

In a further embodiment of any of the above, the plurality of non-rectangular slots are axially aligned on the outer surface of the wall and radially spaced from an adjacent one of the plurality of non-rectangular slots.

In a further embodiment of any of the above, the intermediate portions of each of the adjacent plurality of non-rectangular slots are connected by an intermediate bridge portion.

In a further embodiment of any of the above, at least one of the inlet portion, the outlet portion, and the intermediate portion includes a plurality of pedestals.

In a further embodiment of any of the above, a plurality of guide pedestals is downstream of the plurality of pedestals and upstream of the slot.

In a further embodiment of any of the above, the wall is located on at least one of a blade, a vane, a blade outer air seal, and a combustor liner.

In another exemplary embodiment, a wall of a component of a gas turbine engine is subjected to a flow of high temperature gas. The wall comprises a wall having an inner surface and an outer surface. At least one non-rectangular slot extends through the outer wall surface and is in communication with a passage. The passages extend through the wall and include an inlet portion located at the inner surface, an outlet portion located at the outer surface. An intermediate portion fluidly connects the inlet portion and the outlet portion.

In a further embodiment of any of the above, a slot includes an elongated trapezoidal shape.

In a further embodiment of any of the above, the non-rectangular slot includes a plurality of protrusions that extend into the slot from at least one of a downstream side and an upstream side.

In a further embodiment of any of the above, the non-rectangular slot includes a serpentine pattern.

In a further embodiment of any of the above, at least one non-rectangular slot includes a plurality of non-rectangular slots spaced radially from each other.

In a further embodiment of any of the above, the intermediate portions of each of the adjacent plurality of non-rectangular slots are connected by an intermediate bridge portion.

In a further embodiment of any of the above, at least one of the inlet portion, the outlet portion, and the intermediate portion includes a plurality of pedestals.

In a further embodiment of any of the above, a plurality of guide pedestals is downstream of the plurality of pedestals and upstream of the slot.

In a further embodiment of any of the above, the wall is located on at least one of a blade, a vane, a blade outer air seal, and a combustor liner.

DETAILED DESCRIPTION

Figure 1:
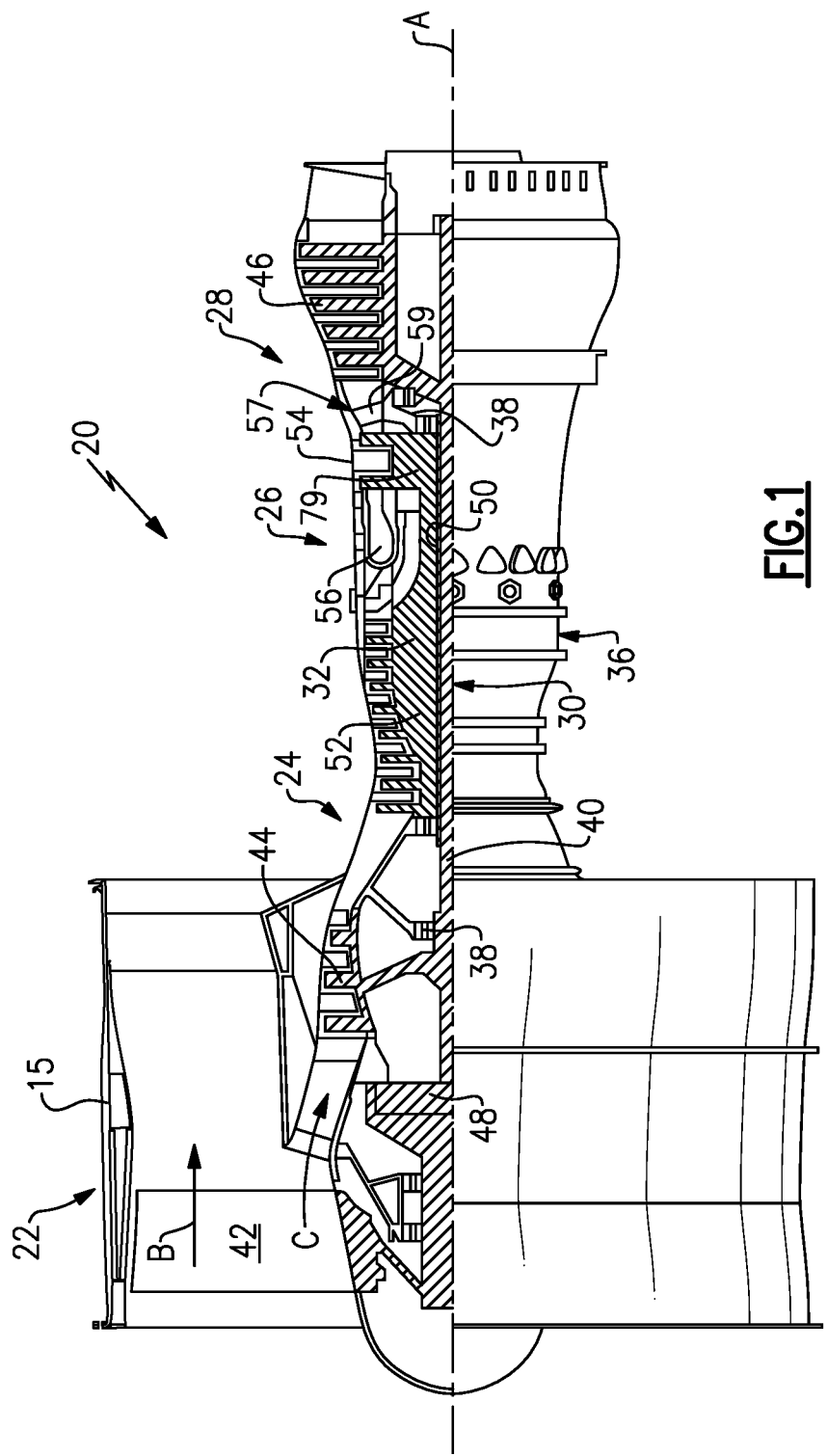
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
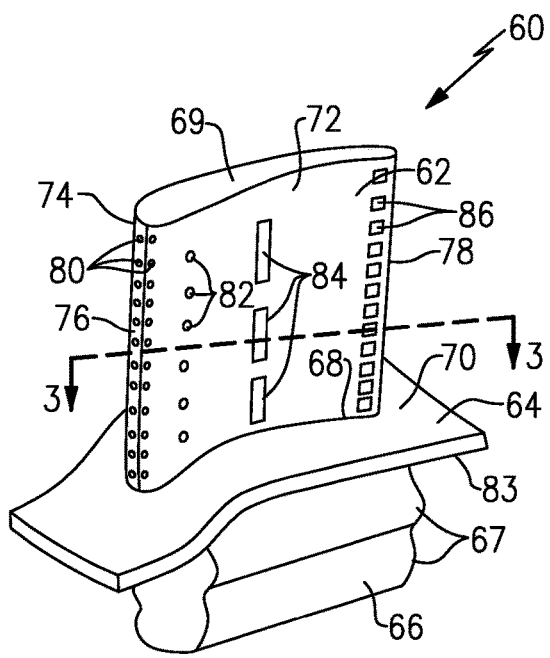
FIG. 2 illustrates an example airfoil.

FIG. 2 illustrates an example gas turbine engine component 60, such as an airfoil structure. In the illustrated example, the component 60 includes an airfoil 62, a platform 64, and optionally a root portion 66. In the illustrated example, the component 60 is a turbine blade. However, the component 60 could also be a vane, or a compressor blade. The component 60 is configured to form a circumferential ring surrounding the engine axis A when jointed with additional similar components 60. In this disclosure, circumferential or circumferentially spaced is relative to a circumference surrounding the engine axis A of the gas turbine engine 20 unless otherwise specified.

The airfoil 62 includes a pressure side 72 and a suction side 74 separated by a leading edge 76 and a trailing edge 78. The pressure side 72 of the component 60 is generally concave and the opposing suction side 74 is generally convex. A first airfoil end 68 is rigidly attached to a radially outer side 70 of the platform 64 and a second airfoil end 69 is spaced from the platform 64 forming a free end. However, the second airfoil end 69 could also include a radially outer platform or tip shroud.

In the illustrated example, the airfoil 62 is formed integral with the platform 64 such that the airfoil 62 and the platform 64 form an integral or unitary piece. In another example, the airfoil 62 and the platform 64 could be formed separately and then attached to each other. In this disclosure, radial or radial direction is relative to the engine axis A of the gas turbine engine 20 unless otherwise specified.

The radially outer side 70 of the platform 64 forms a radially inner boundary for fluid traveling over the component 60. The root portion 66 extends radially inward from the platform 64 to retain the component 60 to a turbine rotor 79 (FIG. 1). The root portion 66 is located on an opposite side of the platform 64 from the airfoil 62 on a radially inner side 83. The root portion 66 includes teeth 67 located on opposite sides of the root portion 66 for engaging complimentary shaped receptacles on the turbine rotor 79 of the gas turbine engine 20.

As shown in FIG. 2, a first plurality of cooling holes 80 is spaced radially along the leading edge 76 of the airfoil 62 on both the pressure side 72 and the suction side 74. The cooling holes 80 have a circular cross section. Although the cooling holes 80 in the illustrated example are circular, other shapes such as elliptical holes, oval holes, oblong holes, and race-track shaped holes could be used.

A second plurality of cooling holes 82 is spaced radially along the pressure side 72 of the airfoil downstream of the leading edge 76. Although the second plurality of cooling holes 82 is axially aligned, the second plurality of cooling holes 82 could be axially offset from each other.

A plurality of non-rectangular cooling slots 84 is spaced radially along the pressure side 72 of the airfoil 62. In the illustrated example, the plurality of cooling slots 84 is axially aligned and extends in a radial direction. However, the plurality of cooling slots 84 could be axially spaced from each other and/or be within 40 degrees of perpendicular to the axis A.

A third plurality of cooling holes 86 is spaced radially along the pressure side 72 of the airfoil 62 immediately upstream of the trialing edge 78. Although the third plurality of cooling holes 86 is axially aligned, the third plurality of cooling holes 86 could be axially offset from each other.

The first plurality of cooling holes 80, the second plurality of cooling holes 82, the third plurality of cooling holes 86, and the plurality of cooling slots 84 provide film cooling to the outer surface of the airfoil 62 to cool the airfoil 62 during operation of the gas turbine engine 20.

Figure 3:
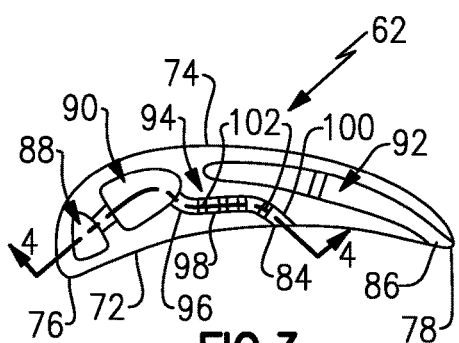
FIG. 3 illustrates a sectional view taken along line 3-3 of FIG. 2.
Figure 4:
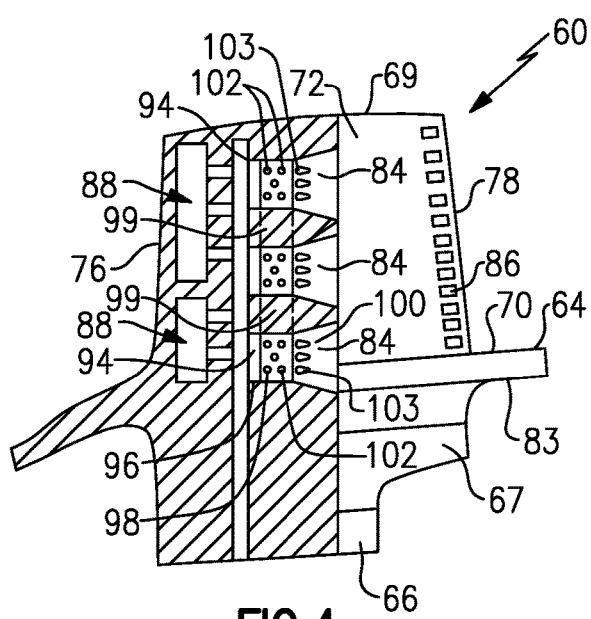
FIG. 4 illustrates a sectional view taken along line 4-4 of FIG. 3.

As shown in FIGS. 3 and 4, the airfoil 62 includes internal cooling passages, such as a leading edge cooling passage 88, an intermediate cooling passage 90, and a trailing edge cooling passage 92. In the illustrated example, the intermediate cooling passage 90 feeds cooling airflow to the plurality of cooling slots 84 to create a cooling film over the pressure side 72 as the cooling airflow travels out of the plurality of cooling slots 84 and towards the trialing edge 78. However, the plurality of cooling slots 84 could be fed from either the leading edge cooling passage 88 or the trialing edge cooling passage 92.

The plurality of cooling slots 84 are each fed by a slot passage 94. The slot passage 94 includes an inlet portion 96, an intermediate portion 98, and an outlet portion 100. In the illustrated example, the inlet portion 96 fluidly connects the intermediate cooling passage 90 to the intermediate portion 98 of the slot passage 94. The outlet portion 100 fluidly connects the intermediate portion 98 to one of the plurality of cooling slots 84. The inlet portion 96 and the outlet portion 100 are transverse to the intermediate portion 98. At least one of the inlet portion 96, intermediate portion 98, and outlet portion 100 includes a plurality of pedestals 102 or a plurality of tear drop shaped pedestals 103.

In another example, the intermediate portion 98 of the slot passages 94 could be connected to a radially adjacent intermediate portion 98 by an intermediate bridge portion 99 (shown in dashed lines in FIG. 4). The intermediate bridge portion 99 and the intermediate portion 98 form a continuous fluid connection between a radially inner slot passage 94 and a radially outer slot passage 94 separate from the intermediate cooling passage 90.

Figure 5:
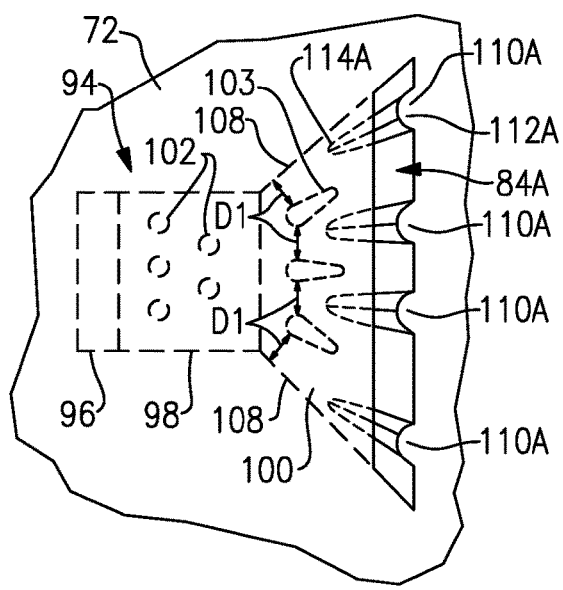
FIG. 5 illustrates a view of an example cooling slot.

FIG. 5 illustrates an example cooling slot 84A. The example cooling slot 84A includes the inlet portion 96, the intermediate portion 98, and the outlet portion 100. The plurality of pedestals 102 are circular and located in the intermediate portion 98 and extend between opposite circumferential sides of the intermediate portion 98. The plurality of tear drop shaped pedestals 103 are located in the outlet portion 100 and extend between opposite circumferential sides of the outlet portion 100. In another example, the tear drop shaped pedestals 103 could be located within the intermediate portion 98 or extend between both the intermediate portion 98 and the outlet portion 100. The tear drop shaped pedestals 103 are spaced a distance D1 from each other at a leading edge and the tear drop shaped pedestals 103 are also spaced a distance D1 from a wall 108 of the outlet passage 100 along the leading edge.

A plurality of semi-circular or elliptical protrusions 110A protrude into the cooling slot 84A from a downstream side of the cooling slot 84A. The plurality of protrusions 110A is continuous with the pressure side 72 of the airfoil 62. The plurality of protrusions 110A taper from a downstream end 112A towards an upstream end 114A. The plurality of protrusions 110A extends along a circumferential face of the outlet portion 100 of the slot passage 94 adjacent the suction side 74 of the airfoil 62.

The plurality of protrusions are offset from the tear drop shaped pedestals 103 so that the upstream end 114A at least partially aligns with cooling airflow traveling between the tear drop shaped pedestals 102 or the tear drop shaped pedestal 102 and the wall 108. In the illustrated example, there are only four protrusions 110A. In another example, there could be at least two protrusions 110A.

The tear drop shaped pedestals 102 and the protrusions 110A extend in an outward fan pattern to direct cooling airflow traveling through the slot passage 94 towards the radial ends of the cooling slot 84A. By increasing the amount of cooling airflow that reaches the radial ends of the cooling slot 84A, a length of the cooling slot 84A in the radial direction can be increased which increases the coverage of film cooling on the pressure side 72 of the airfoil 62.

Although the cooling slots 84A and the slot passage 94 is shown adjacent a mid-section of the airfoil 62, the cooling slots 84A, could be located adjacent the trailing edge 78 of the airfoil. Alternatively, the cooling slots 84A and slot passage 94 can be located on the suction side 74, the radially outer side 70 of the platform 64, or the radially inner side 83 of the platform 64.

Figure 6:
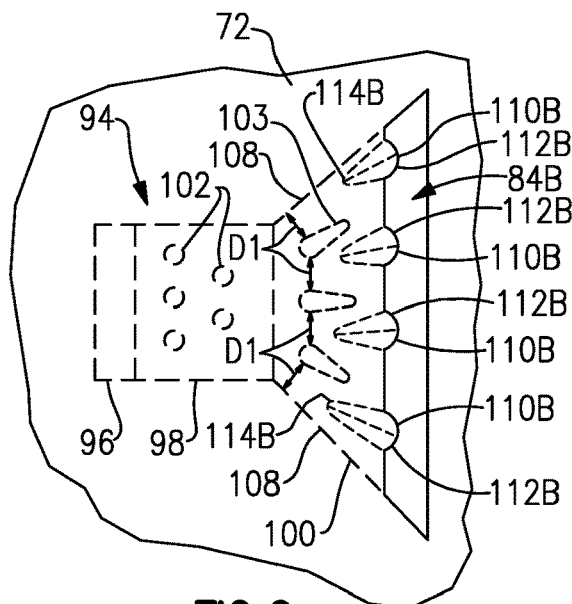
FIG. 6 illustrates a view of another example cooling slot.

FIG. 6 illustrates another example cooling slot 84B. The example cooling slot 84B is similar to the cooling slot 84A except where described below or show in the Figures. A plurality of semi-circular or elliptical protrusions 110B protrudes into the cooling slot 84B from an upstream side of the cooling slot 84B. The plurality of protrusions 110B taper from a downstream end 112B towards an upstream end 114B. The plurality of protrusions 110B extends along a circumferential face of the outlet portion 100 of the slot passage 94 adjacent the pressure side 72 of the airfoil 62.

The plurality of protrusions are offset from the tear drop shaped pedestals 102 so that the upstream end 114B at least partially aligns with cooling airflow traveling between the tear drop shaped pedestals 102 or the tear drop shaped pedestal 102 and the wall 108.

Figure 7:
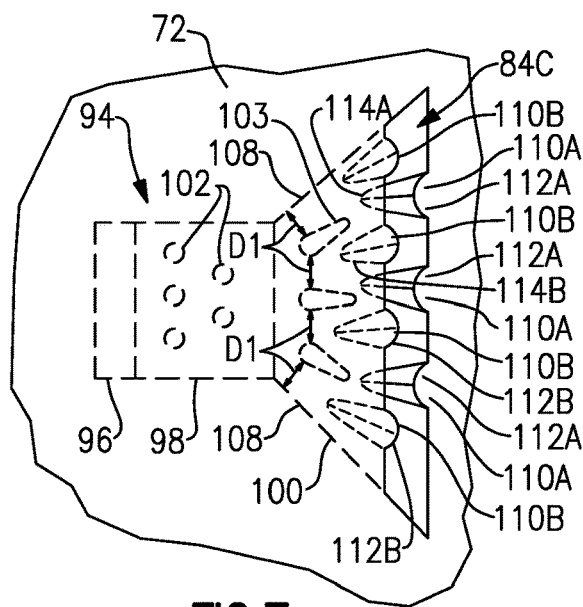
FIG. 7 illustrates a view of yet another example cooling slot.

FIG. 7 illustrates another example cooling slot 84C. The example cooling slot 84C is similar to the cooling slots 84A and 84B except where described below or show in the Figures. The cooling slot 84C includes three of the protrusions 110A on the downstream side of the cooling slot 84C and four of the protrusions 110B on the upstream side of the cooling slot 84C. The protrusions 110A are offset from the protrusions 110B. Although the illustrated example includes three of the protrusions 110A and four of the protrusions 110B, the number of protrusions 110A, 110B may vary depending on the desired amount of restriction of cooling airflow in the cooling slot 84C.

Figure 8:
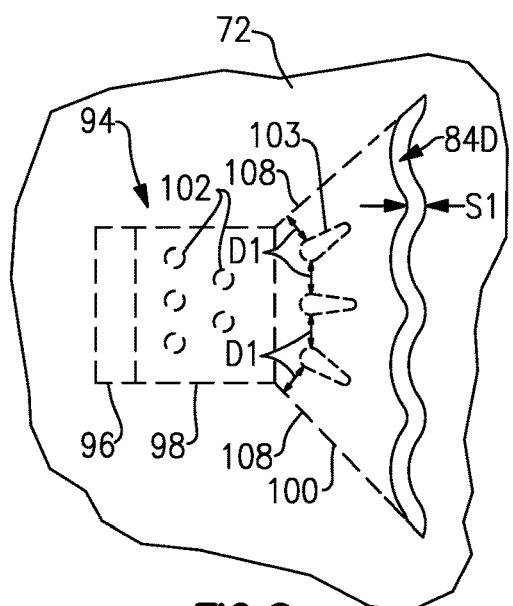
FIG. 8 illustrates a view of a further example cooling slot.

FIG. 8 illustrates another example cooling slot 84D. The example cooling slot 84D is similar to the cooling slot 84A except where described below or show in the Figures. The cooling slot 84D extends in a radial direction in a serpentine pattern and maintains a slot width of approximately Si between opposing axial sides of the cooling slot 84D.

Figure 9:
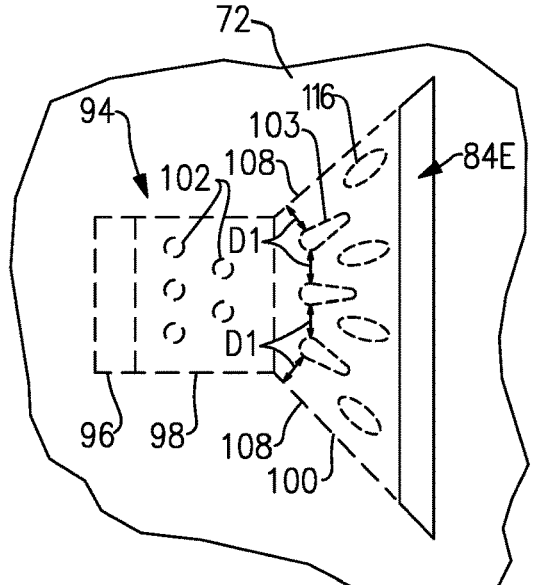
FIG. 9 illustrates a view of yet a further example cooling slot.

FIG. 9 illustrates another example cooling slot 84E. The example cooling slot 84E is similar to the cooling slot 84A except where described below or show in the Figures. The cooling slot 84E includes a trapezoidal shape with a plurality of guide pedestals 116 located downstream of the pedestals 102 and upstream of the cooling slot 84E. The guide pedestals 116 are elliptical in cross section and extend between circumferential faces of the outlet portion 100. The guide pedestals 116 could also have a tear drop cross section. The guide pedestals 116 direct cooling airflow toward the radially outer ends of the cooling slot 84E. The guide pedestals 116 can be round, oval, elliptical, oblong, or race tracked.

Although the cooling slots 84A-84E are illustrated in the pressure side 72 of the airfoil 62, the cooling slots 84A-84E and the associated slot passage 94 could be incorporated into a wall in other components in a gas turbine, such as a blade outer air seal, combustor liner, vane, or any other component that requires cooling.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine component comprising:
   a wall having an inner surface and an outer surface;
   an inlet opening defined by the inner surface;
   at least one outlet opening having a non-rectangular perimeter defined by the outer surface with at least one protrusion extending into the perimeter of the outlet opening and the at least one protrusion is defined by the outer surface;
   a slot passage fluidly connecting the inlet opening to the outlet opening, the slot passage comprising:
      an inlet passage extending through the wall from the inlet opening and terminating at an outlet to the inlet passage;
      an intermediate passage extending through the wall from the outlet of the inlet passage and terminating at an outlet of the intermediate passage; and
      an outlet passage extending through the wall from the outlet of the intermediate passage to an outlet of the outlet passage at the outer surface, the outlet passage having a cross-sectional area that increases from an inlet of the outlet passage to the outlet of the outlet passage;
      wherein the at least one protrusion extends partially across the outlet of the outlet passage and upstream towards a plurality of pedestals located within the outlet passage.

2. The gas turbine engine component of claim 1, wherein the at least one protrusion extends from a downstream side of the at least one outlet opening.

3. The gas turbine engine component of claim 1, wherein the at least one protrusion extends from an upstream side of the at least one outlet opening.

4. The gas turbine engine component of claim 1, wherein the at least one protrusion includes a plurality of protrusions extending into a single outlet opening of the at least one outlet opening at least one of the plurality of protrusion defined by the outer surface on a downstream side of the single outlet opening and extending into a perimeter of the single outlet opening and at least one of the plurality of protrusions defined the outer surface on an upstream side of the single outlet opening and extending into the perimeter of the single opening.

5. The gas turbine engine component of claim 1, wherein the at least one outlet opening includes a plurality of outlet openings spaced radially from each other and each of outlet openings includes a corresponding slot passage.

6. The gas turbine engine component of claim 5, wherein the plurality of outlet openings are axially aligned on the outer surface of the wall and radially spaced from an adjacent one of the plurality of outlet openings.

7. The gas turbine engine component of claim 5, wherein the intermediate passage on adjacent corresponding slot passages are fluidly connected by an intermediate bridge portion.

8. The gas turbine engine component of claim 1, wherein the inlet passage includes a plurality of pedestals.

9. The gas turbine engine component of claim 1, wherein the wall is located on at least one of a blade, a vane, a blade outer air seal, and a combustor liner.

10. The gas turbine engine component of claim 1, wherein the outlet passage flares outward in opposing radial directions relative to an axis of rotation of the gas turbine engine from an inlet of the outlet passage at the outlet of the intermediate passage toward the at least one outlet openings.

11. A wall of a component of a gas turbine engine subjected to a flow of high temperature gas, the wall comprising:
   a wall having an inner surface and an outer surface;
   at inlet opening defined by the inner surface;
   at least one outlet openings having a non-rectangular perimeter defined by the outer surface with at least one protrusion extending into the perimeter of the outlet opening and defined by the outer surface;
   a slot passage fluidly connecting the inlet opening to the at least one outlet opening, the slot passage comprising:
      an inlet passage extending through the wall from the inlet opening and terminating at an outlet to the inlet passage;
      an intermediate passage extending through the wall from the outlet of the inlet passage and terminating at an outlet of the intermediate passage; and
      an outlet passage extending through the wall from the outlet of the intermediate passage to an outlet of the outlet passage at the outer surface, the outlet passage having a cross-sectional area that increases from an inlet of the outlet passage to the outlet of the outlet passage;

wherein the at least one protrusion extends partially across the outlet of the outlet passage and upstream towards a plurality of pedestals located within the outlet passage.

12. The wall of claim 11, wherein the at least one protrusion extends from a downstream side of the at least one outlet opening.

13. The wall of claim 11, wherein the at least one protrusion extends from an upstream side of the at least one outlet opening.

14. The wall of claim 11, wherein the at least one protrusion includes a plurality of protrusions extending into a single outlet opening of the at least one outlet opening with at least one of the plurality of protrusions defined by the outer surface on a downstream side of the single outlet opening and extending into a perimeter of the single outlet opening and at least one of the plurality of protrusions defined the outer surface on an upstream side of the single outlet opening and extending into the perimeter of the single opening.

15. The wall of claim 11, wherein the at least one outlet opening includes a plurality of outlet openings spaced radially from each other and each of the plurality of outlet openings includes a corresponding slot passage.

16. The wall of claim 15, wherein the intermediate passage on adjacent corresponding slot passages are fluidly connected by an intermediate bridge portion.

17. The wall of claim 11, wherein at least one of the inlet passage includes a plurality of pedestals.

18. The wall of claim 11, wherein the wall is located on at least one of a blade, a vane, a blade outer air seal, and a combustor liner.

* * * * *